United States Patent [19]
Sewell et al.

[11] Patent Number: 5,927,427
[45] Date of Patent: Jul. 27, 1999

[54] SEAT WEIGHT HAVING SELF-REGULATING FLUID FILLED BLADDER

[75] Inventors: Michael R. Sewell, Chatham, Canada; Donald A. Duda, Novi, Mich.

[73] Assignee: Automotive Systems Laboratory, Inc., Farmington Hills, Mich.

[21] Appl. No.: 09/003,851

[22] Filed: Jan. 7, 1998

Related U.S. Application Data

[60] Provisional application No. 60/058,086, Sep. 5, 1997.

[51] Int. Cl.$^6$ ...................................................... B60K 28/00
[52] U.S. Cl. ...................... 180/273; 280/735; 297/DIG. 3
[58] Field of Search ....................................... 180/273, 271; 280/735, 734; 297/DIG. 3, 199; 73/37, 700; 340/667

[56] References Cited

U.S. PATENT DOCUMENTS

| | | | |
|---|---|---|---|
| 4,022,146 | 5/1977 | Sadler | 180/273 X |
| 4,644,597 | 2/1987 | Walker | 5/449 |
| 4,908,895 | 3/1990 | Walker | 255/453 |
| 4,957,286 | 9/1990 | Persons, II et al. | 272/73 |
| 4,987,898 | 1/1991 | Sones | 128/645 |
| 5,232,243 | 8/1993 | Blackburn et al. | 280/735 |
| 5,529,377 | 6/1996 | Miller | 297/DIG. 3 |
| 5,606,516 | 2/1997 | Douglas | 364/571.04 |
| 5,634,685 | 6/1997 | Herring | 297/219.11 |

Primary Examiner—Christopher P. Ellis
Attorney, Agent, or Firm—Lyon, P.C.

[57] ABSTRACT

A hydrostatic weight sensor incorporates a bladder having a plurality of cells in fluid communication with one another, and with the outlet of a check valve, the inlet of which is in fluid communication with a source of sensing fluid, preferably the atmosphere. A cell-filling restoring mechanism is operatively coupled to a portion of the cells of the bladder. When the applied load is removed from the hydrostatic weight sensor, the volume of those cells operatively coupled to the cell-filling restoring mechanism is restored, whereupon if the pressure becomes less than the local atmospheric pressure, then fluid is added to the bladder through the check valve, thereby restoring lost sensing fluid. A pressure sensor operatively coupled to the bladder generates a signal responsive to the pressure of the sensing fluid within the bladder, and a signal processor calculates the weight of the occupant therefrom.

15 Claims, 5 Drawing Sheets

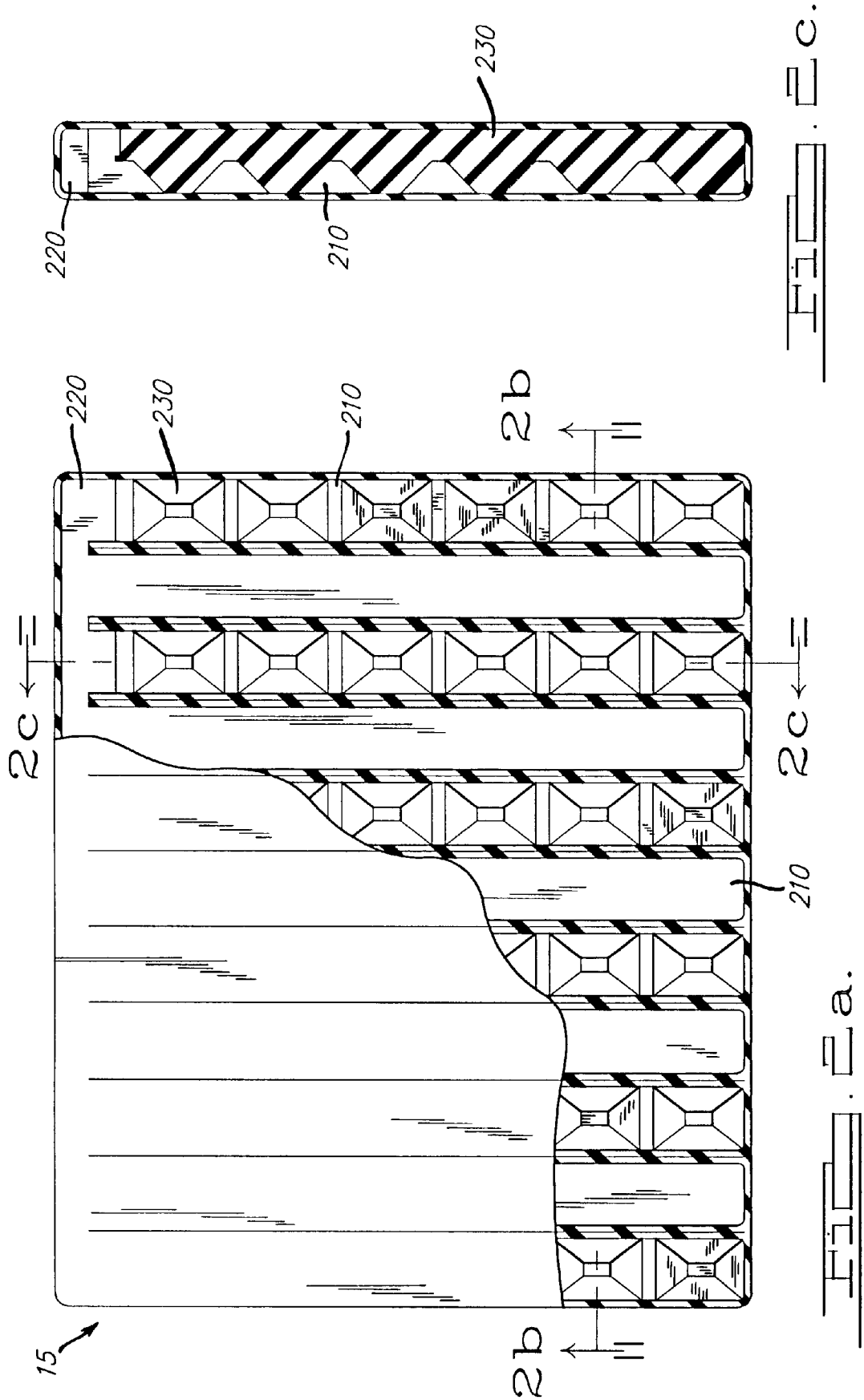

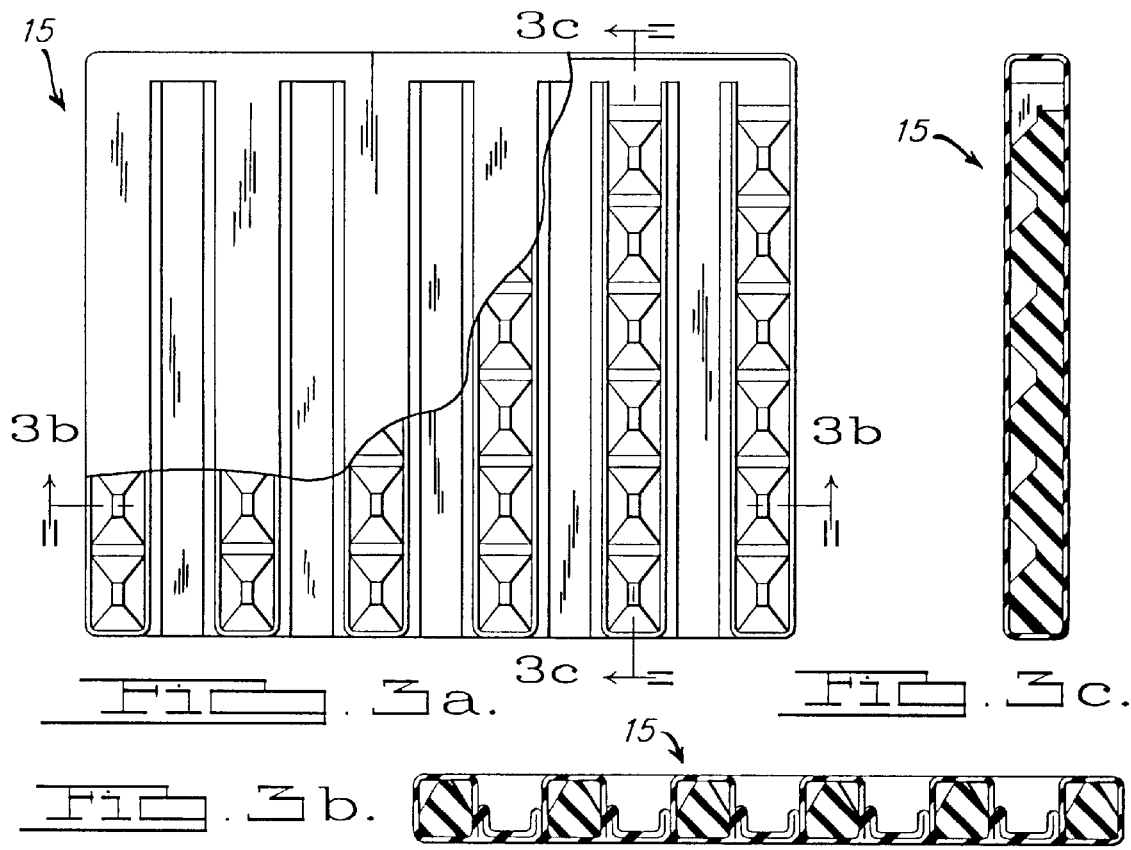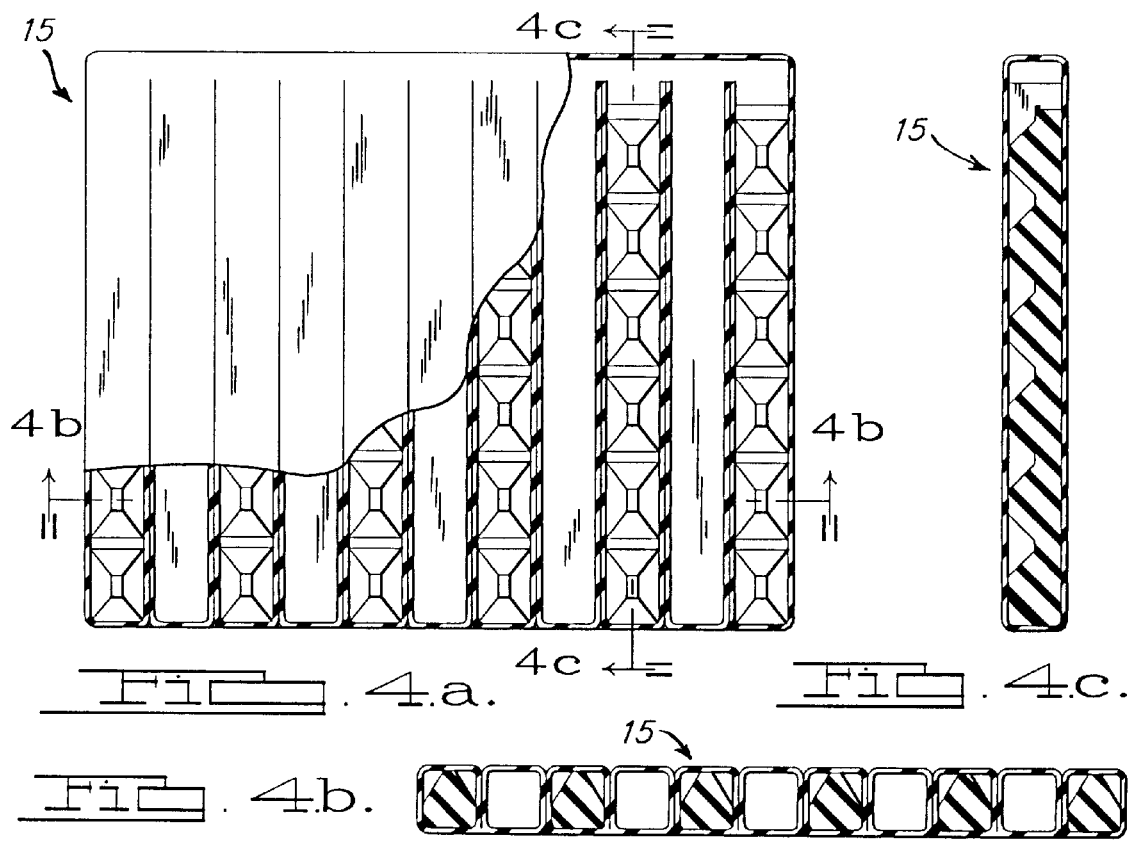

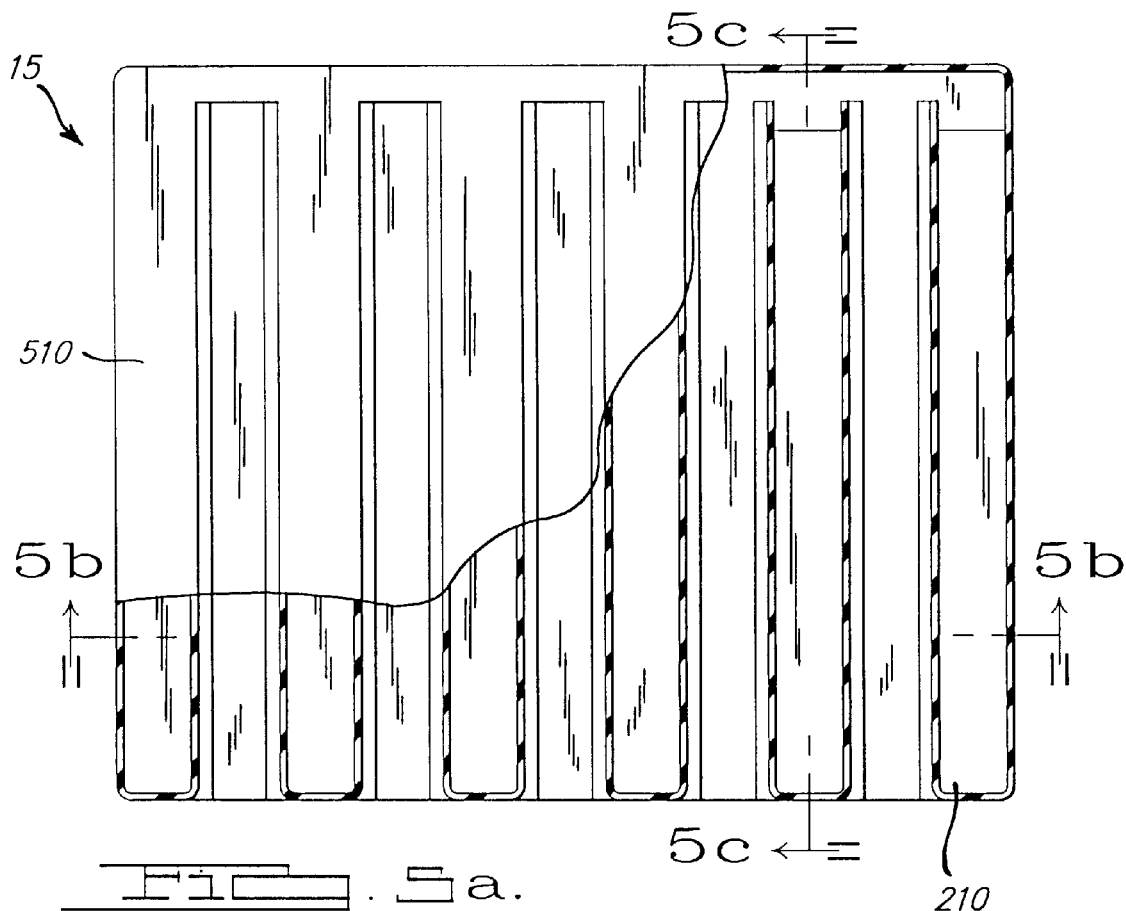
FIG. 5a.
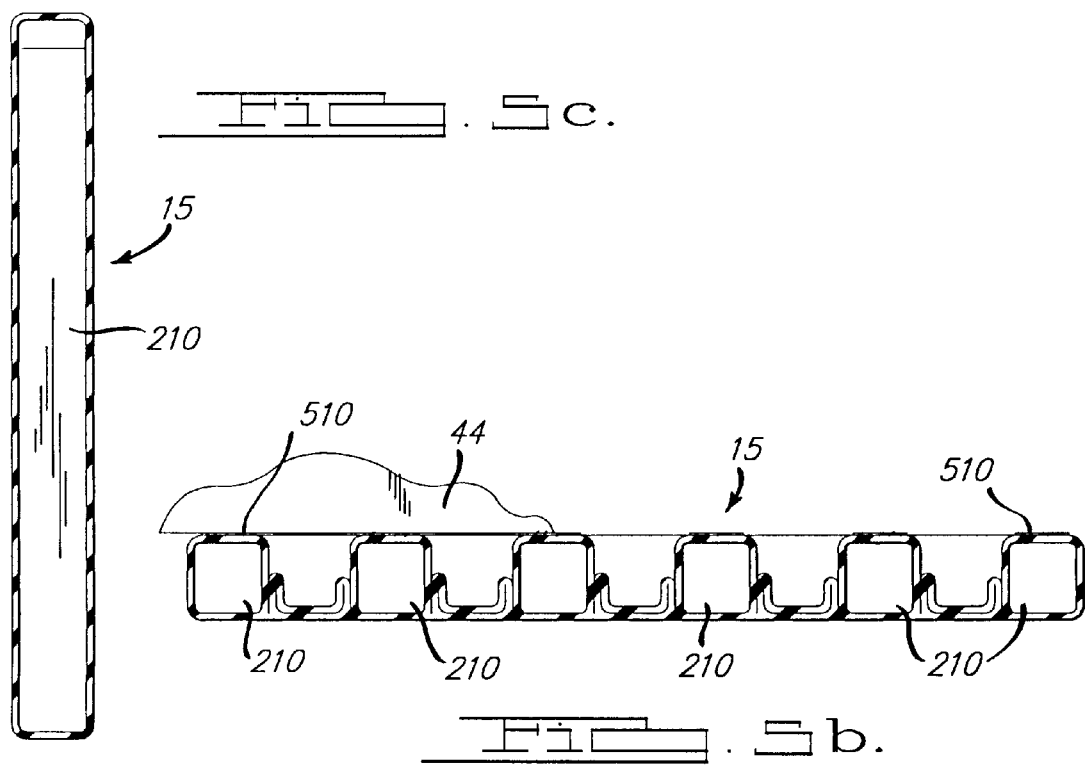
FIG. 5c.
FIG. 5b.

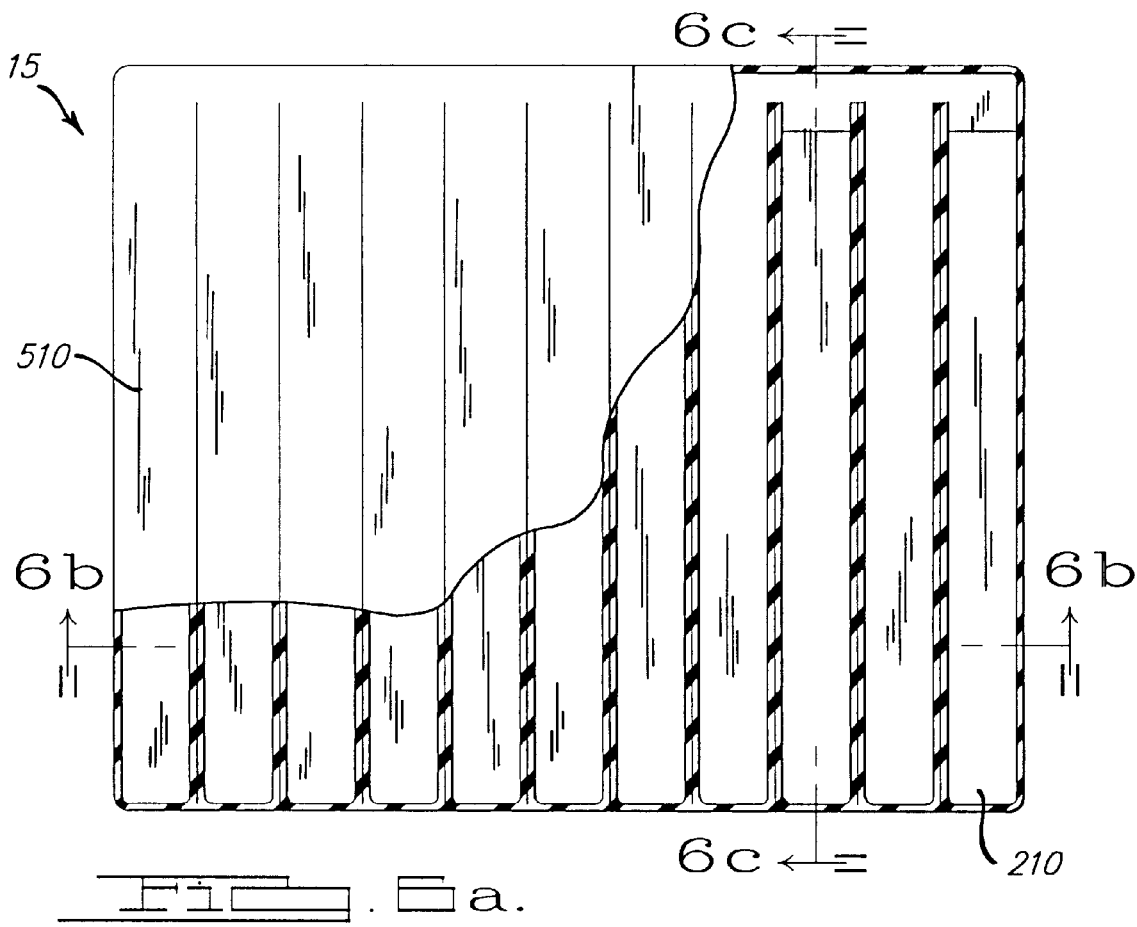
FIG. 6a.
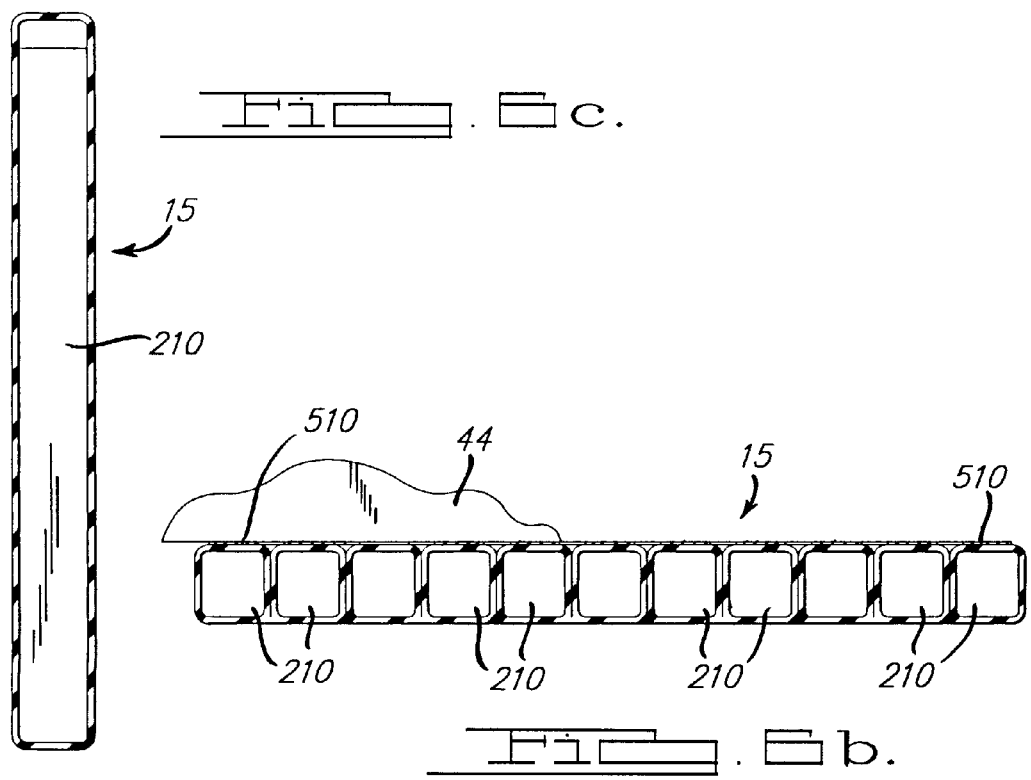
FIG. 6c.
FIG. 6b.

SEAT WEIGHT HAVING SELF-REGULATING FLUID FILLED BLADDER

CROSS-REFERENCE TO RELATED APPLICATIONS

The instant application claims the benefit of U.S. Provisional Application Ser. No. 60/058,086 filed on Sep. 5, 1997.

Co-pending U.S. application Ser. No. 08/933,701 hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL157-US also discloses a load distributor for distributing loads across the load bearing surface of the hydrostatic weight sensor. Application ASL-157-US and U.S. Provisional application Ser. No. 660/032,380 are incorporated herein by reference.

Co-pending U.S. application Ser. No. 09/033,672 hereinafter "Application ASL-161-US", entitled "Automotive Seat Weight Sensing System", filed on Jan. 7, 1997 claiming benefit of U.S. Provisional Application Ser. No. 60/034,018 filed on Jan. 8, 1997, and assigned to the assignee of the instant invention discloses a seat weight sensing system comprising a plurality of hydrostatic weight sensors each of which is in accordance with Application ASL-157-US.

Co-pending U.S. application Ser. No. 09/003,870 hereinafter "Application ASL-163-US", entitled "Vehicle Seat Sensor Having Self-Maintaining Air Bladder", filed on Jan. 7, 1997 claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor.

Co-pending U.S. application Ser. No. 09/003,868 hereinafter "Application ASL-186-US", entitled "Seat Weight Sensor with Means for Distributing Loads", filed on Jan. 7, 1997 claiming benefit of U.S. Provisional Application Ser. No. 60/058,084 filed on Sep. 4, 1997, and assigned to the assignee of the instant invention discloses a load distributor for distributing sensed load across the load bearing surface of a hydrostatic weight sensor. Application ASL-186-US and U.S. Provisional Application Ser. No. 60/058,084 are incorporated herein by reference.

Co-pending U.S. application Ser. No. 09/003,673 hereinafter "Application ASL-187-US", entitled "Seat Weight Sensor Having Self-Regulating Fluid Filled Bladder", filed on Jan. 7, 1997 claiming benefit of U.S. Provisional Application Ser. No. 60/058,119 filed on Sep. 4, 1997, and assigned to the assignee of the instant invention discloses a hydrostatic weight sensor having a means for automatically regulating the amount of sensing fluid therein.

Co-pending U.S. application Ser. No. 09/003,850 hereinafter "Application ASL-193-US", entitled "Altitude/Temperature Compensation for a Gas-Filled Weight Sensor", filed on Jan. 7, 1997 claiming benefit of U.S. Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. application Ser. No. 09/503,746 hereinafter "Application ASL-194-US", entitled "Seat Weight Sensor Using Fluid Filled Tubing", filed on Jan. 7, 1997 claiming benefit of U.S. Provisional Application Ser. No. 60/065,986 filed on Nov. 14, 1997, and assigned to the assignee of the instant invention discloses a hydrostatic weight sensor incorporating a fluid filled tube.

Co-pending U.S. application Ser. No. 09/003,744 hereinafter "Application ASL-195-US", entitled "Low Profile Hydraulic Seat Weight Sensor", filed on Jan. 7, 1997 claiming benefit of U.S. Provisional Application Ser. No. 60/065,832 filed on Nov. 14, 1997, and assigned to the assignee of the instant invention discloses a hydrostatic weight sensor constructed from constructed from plates or sheets of semi-rigid material and filled with a liquid, grease, Bingham fluid or thixotropic material.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $½ M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline filly forward. Moreover, the sensing aperture of these sensors may become occluded by inadvertent scratching or substance application.

Known seat weight sensing techniques generally require multiple points for sensing distributed weight accurately.

Also, force sensing resistors, load cells or membrane switches may require significant seat redesign for use in current or future seats. This is particularly true for spring type seats which do not provide a uniform horizontal support surface. The response time of load cells or membrane switches may fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic hydrostatic weight sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic hydrostatic weight sensors can be sensitive to the amount of air initially in the associated bladder. A seat weight sensor in an automotive environment must function reliably and accurately over a wide range of temperatures and pressures which can cause significant errors.

Another problem with a pneumatic hydrostatic weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic hydrostatic weight sensor is that a gas filled bladder is also prone to loss of fluid by leakage or osmosis, which necessitates a means for replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

Generally, a pneumatic hydrostatic weight sensor comprises a gas filled bladder mounted in the seat, a means for distributing the weight to be measured over the surface of the bladder, and a means for indicating the weight on the seat by measuring the pressure within the bladder relative to the ambient pressure. The pneumatic hydrostatic weight sensor may further comprise a means for refilling the gas within the gas-filled bladder to account for losses over time.

The gas-filled bladder is preferably only partially filled to allow for gaseous expansion due to variations in ambient temperature and pressure, such that over the possible range of environmental operating conditions the volume of the unloaded gas-filled bladder generally does not exceed the design volume thereof Moreover, under these conditions, the associated absolute pressure in the bladder would not exceed ambient pressure.

Under the action of a distributed load, the volume of the bladder decreases until the pressure therein is sufficiently great to support the load. For a bladder having a design shape of a rectangular slab having a height and two base dimensions, as the height decreases under the action of the load, the base dimensions increase, thereby increasing the base area of the bladder. The weight of the distributed load is then given by the product of the base area of the bladder times the difference in pressure inside and outside the bladder. Even if the loading on the top of the seat is relatively localized, the associated weight is given by the differential pressure acting on the base area of the bladder, assuming the base of the bladder is fully supported and that that top surface of the bladder is not locally compressed against the bottom surface.

As noted above, the bladder is preferably only partially filled under nominal ambient conditions. Therefore, the action of a concentrated load on the bladder would most likely cause the top surface of the bladder to bottom out on the bottom surface. This prevents a portion of the load from being supported by the gas within the bladder so that the corresponding differential pressure measurement would not properly indicate the full weight on the bladder. This condition can be alleviated by providing a means for distributing the load across the bladder, such as with the foam pad constituting the seat cushion.

Generally, the sensitivity of the gas filled bladder to ambient temperature and pressure is decreased with decreasing amounts of gas in the bladder, and with decreasing bladder thickness for the same base dimensions of the bladder. However, as the bladder is made thinner in overall height, and the amount of gas is reduced, the bladder becomes more susceptible to bottoming-out under the influence of localized loads applied to the seat.

The gas-filled bladder may be of sealed construction with a fixed initial amount of gas. Alternately, the bladder may be equipped with a filling valve to refill gas that is lost to either osmosis or leakage. Furthermore, the bladder may be equipped with a means to automatically refill this lost gas with the preferable amount of gas relative to the design volume of the bladder, generally about 30% to 50% of the design volume, and more particularly about 40%.

When incorporating a means for automatically refilling the bladder, the amount of gas in the bladder at any given time would likely not be known. The weight on the sensor is given by the expression $W=DP/A$, where DP is the differential pressure between the inside and outside of the bladder, and A is the base area of the bladder. The effect of the base area A of a partially filled bladder increasing with increasing load is included in the calibration. This effect is smaller for relatively thinner bladders, and is relatively insensitive to the fill conditions of the bladder.

The instant invention provides a system and method for partially filling the gas-filled bladder of a pneumatic hydrostatic weight sensor. The instant invention also provides a system and method for regulating the amount of gas in the bladder of a pneumatic hydrostatic weight sensor during an automatic fill operation.

In the instant invention, the gas filled bladder of a pneumatic hydrostatic weight sensor is constructed from a plurality of cells. The cells are preferably formed as longitudinal strips or tubes which extend substantially along the length of the bladder, and are substantially parallel to one another. The cells communicate with one another via either a one or more internal manifolds, or via passageways incorporated between adjacent cells, to allow for internal air flow and pressure equalization. Seams are incorporated between adjacent cells to prevent over-inflation and thus maintain comfort by preventing any large change in seat geometry with changes in ambient temperature or pressure conditions. The internal manifold(s) are either formed as part of the bladder or are separately attached to one or both ends of the strips. A portion of the cells, preferably half, and more preferably every other cell, are adapted to contain or cooperate with a cell-filling restoring medium or mechanism which acts to preferentially maintain those cells at approximately their original design volume. The remainder of the cells are empty.

Upon assembly of the gas filled bladder, the bladder is initially evacuated. Then, those cells containing or cooperating with a cell-filling restoring medium or mechanism are refreshed to their design volume with ambient air admitted through a check valve. The remainder of the cells preferably remain unfilled. In operation, when a load is applied to the bladder, the gas in the bladder distributes itself amongst all cells via either the internal manifold or passageways. Upon removal of the load, those cells containing or cooperating with a cell-filling restoring medium or mechanism are refreshed from the contents of the remainder of the cells, wherein the instant invention is adapted so that fluid communication between the individual cells is preferable to fluid communication with the refresh mechanism. As either the ambient temperature increases, or the ambient pressure decreases, the gas in the bladder expands into those cells which do not contain or cooperate with a cell-filling restoring medium or mechanism.

In accordance with the instant invention, a load distributor comprises a means for distributing the load applied to a hydrostatic weight sensor across one or more load bearing surfaces of the hydrostatic weight sensor. A hydrostatic weight sensor is preferably partially filled with fluid, particularly for fluids such as gases that are subject to expansion under the influence of ambient temperature and pressure conditions. A partially filled hydrostatic weight sensor is susceptible to bottoming out under the influence of concentrated loads unless a means is provided for distributing the applied load across the load bearing surfaces of the hydrostatic weight sensor. The seat cushion inherently acts as a load distributor but is subject to localized deformation under the influence of loads that are sufficiently great or sufficiently concentrated. A load distributor preferably is both sufficiently rigid to prevent concentrated loads from causing localized deformations of sufficient magnitude to locally collapse the hydrostatic weight sensor, and sufficiently flexible so as to not interfere with seating comfort. Examples of various load distributors in accordance with the instant invention are disclosed in Applications ASL-157 and ASL-186 referenced hereinabove and incorporated herein by reference.

In one embodiment of the instant invention, the cell-filling restoring medium or mechanism comprises a strip of foam, which is preferentially formed so as to have a large effective spring compliance so as to minimize the amount of force required to compress the foam. In another embodiment of the instant invention, the cell-filling restoring medium or mechanism comprises the attachment, preferably with an adhesive, of the top face of the associated cell to the seat cushion material above the bladder. In yet another embodiment of the instant invention, the cell-filling restoring medium or mechanism comprises a plurality of compliant spring mechanisms.

Accordingly, one object of the instant invention is to provide an improved seat weight sensor which provides a consistent and accurate measure of the seat loading independent of the location of the source of weight on the seat.

A further object of the instant invention is to provide an improved seat weight sensor which provides a consistent and accurate measure of the seat loading independent of the size and distribution of the source of weight on the seat.

A yet further object of the instant invention is to provide an improved seat weight sensor which provides a consistent and accurate measure of the seat loading independent of the amount of weight on the seat.

A yet further object of the instant invention is to provide an improved seat weight sensor which operates over a wide range of ambient temperature and pressure conditions.

A yet further object of the instant invention is to provide an improved seat weight sensor which can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor which can be incorporated into an intelligent safety restraint system for which the preferable mode of the activation of a controllable occupant restraint system is dependent upon the weight of the occupant.

A yet further object of the instant invention is to provide an improved seat weight sensor which does not interfere with occupant comfort.

A yet further object of the instant invention is to provide an improved seat weight sensor which is insensitive to the orientation of the seat.

A yet further object of the instant invention is to provide an improved seat weight sensor which is inexpensive to produce.

In accordance with these objectives, one feature of the instant invention is a fluid filled bladder mounted in the base of the seat.

Another feature of the instant invention is a pressure sensor operatively coupled to the fluid filled bladder for measuring the pressure therein.

Yet another feature of the instant invention is a differential pressure sensor operatively coupled to the fluid filled bag for measuring the pressure therein relative to local atmospheric pressure.

Yet another feature of the instant invention is the incorporation of a gas as the fluid in the fluid filled bladder, wherein under conditions of standard pressure and temperature, the bladder is only partially filled.

Yet another feature of the instant invention is the incorporation of a means for compensating the effects of ambient temperature and pressure.

Yet another feature of the instant invention is the incorporation of the fluid filled bladder below the seat cushion wherein the seat cushion acts to distribute the seat load cross the surface of the bladder.

Yet another feature of the instant invention is the incorporation of a plurality of cells in the bladder, whereby the cells are in fluid communication with one another, wherein a portion of the cells incorporate a cell-filling restoring medium or mechanism and the remainder of the cells are void for purposes of partially filling the bladder.

Yet another feature of the instant invention is the incorporation of one or more manifolds for communicating fluid between the cells of the bladder, and for fluid communication with a check-valve for purposes of refilling the bladder.

The specific features of the instant invention provide a number of associated advantages. One advantage of the instant invention with respect to the prior art is that the gas-filled bladder is responsive to loads over a large area of the seat without regards to the distribution or amount of loading.

Another advantage of the instant invention is that the gas-filled bladder is automatically maintained in a partially-filled state so as enable the seat weight sensor to work consistently and accurately over a wide range of ambient pressures and temperatures.

Yet another advantage of the instant invention is that the seat weight sensor thereof can enable a rear facing infant seat to be distinguished from an occupant for which the air bag system is preferably deployed.

Yet another advantage of the instant invention is that the seat weight sensor thereof is sufficiently robust and accurate to enable associated occupant weight dependent control of a controllable occupant restraint system.

Accordingly, the instant invention provides an improved seat weight sensor which is relatively insensitive to the effects of ambient temperature and pressure; which is simple in construction and relatively robust and reliable in operation; which can be readily incorporated into an automotive seat without interfering with occupant comfort; and which an be produced relatively inexpensively.

These and other objects, features and advantages of the instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

BRIEF DESCRIPTION OF THE DRAWINGS

FIGS. 2a, 2b and 2c illustrate the bladder of a pneumatic hydrostatic weight sensor according to a first embodiment showing the cells of the bladder expanded for purposes of pressure relief.

FIGS. 3a, 3b and 3c illustrate the bladder of a pneumatic hydrostatic weight sensor according to a first embodiment showing the cells of the bladder in their initial collapsed condition.

FIGS. 4a, 4b and 4c are respective copies of FIGS. 2a, 2b and 2c for purposes of comparison with FIGS. 3a, 3b and 3c.

FIGS. 5a, 5b and 5c illustrate the bladder of a pneumatic hydrostatic weight sensor according to a second embodiment showing the cells of the bladder in their initial collapsed condition.

FIGS. 6a, 6b and 6c illustrate the bladder of a pneumatic hydrostatic weight sensor according to a second embodiment showing the cells of the bladder expanded for purposes of pressure relief.

DETAILED DESCRIPTION OF THE PREFERRED EMBODIMENT(S)

Figure 1:
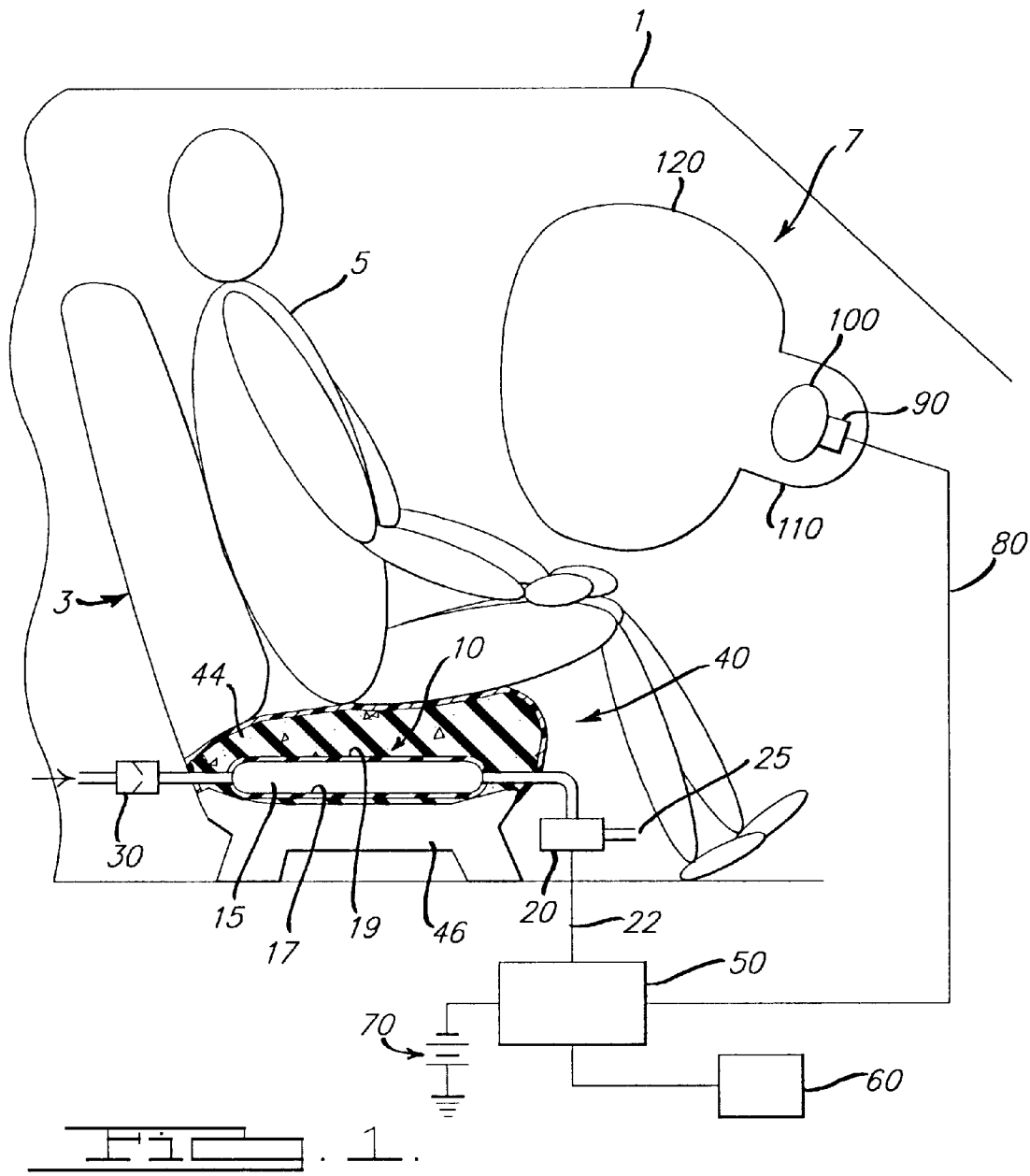
FIG. 1 illustrates one possible environment of the instant invention.

Referring to FIG. 1, a seat 3 in a motor vehicle 1 incorporates a hydrostatic weight sensor 10 mounted in the seat base 40. The hydrostatic weight sensor 10 comprises a fluid-filled bladder 15, a check valve 30 for admitting fluid into the bladder 15, and a differential pressure sensor 20 for measuring the difference in pressure between the bladder 15 and the atmosphere 25. The bladder 15 is sandwiched between the seat frame 46 below and the seat cushion foam 44 above. A check valve 30 admits air into the bladder 15 when the ambient pressure 25 is greater than the bladder 15 pressure, generally responsive to a means internal to the bladder 15 for regulating the amount of fluid in the bladder 15.

In operation, an occupant 5 seated on the base 40 of seat 3 causes the pressure inside the bladder 15 to increase such that that product of the differential pressure, as sensed by differential pressure sensor 20, multiplied times the area of the base 17 of the bladder 15 is equal to the total weight distributed by the seat cushion foam 44 over the top 19 of the bladder 15. The bladder 15 is preferably partially filled with gas so that over the expected range of ambient temperatures and pressures the pressure in an unloaded bladder 15 does not exceed ambient pressure. The pressure signal output 22 from differential pressure sensor 20 is operatively coupled to a signal processor 50 which converts the pressure signal output 22 to a measure of occupant weight using known analog, digital, or microprocessor circuitry and software. A crash sensor 60 is also operatively coupled to the signal processor 50. Responsive to a crash detected by the crash sensor 60, and further responsive to the sensed weight of the occupant as transformed from the pressure signal output 22, the signal processor 50 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 2B:
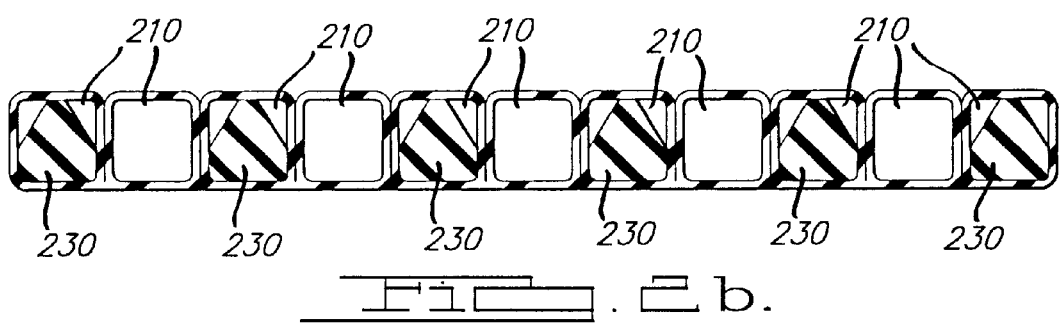

Referring to FIGS. 2a, 2b and 2c the bladder 15 of a hydrostatic weight sensor 10 is shown orthographically in an unloaded but expanded state. The bladder comprises a plurality of cells 210 which are preferably arranged parallel to one another. Preferably, each cell extends for substantially the entire length of one base dimension of the bladder 15. The cells 210 are adapted to be in fluid communication with one another. The bladder may alternately or in combination incorporate one or more manifolds 220 for purposes of communicating fluid between the various cells 210 so as to provide for pressure equalization. The manifold 220 can be formed as part of the bladder 15, or at one or both ends of the cells 210. A seam is provided between adjacent cells 210 to minimize any tendency for "ballooning" by the bladder 15, and so that each cell 210 can act individually according to the pressure, temperature, and weight applied to the system. Alternate cells 210 are provided with one or more foam inserts 230 for purposes of restoring the volume of the cells so provided to the design volume thereof. The foam inserts 230 may be shaped to adjust the force displacement characteristics thereof, preferably so that the effective spring constant of the foam inserts 230 increases with increasing compression thereof. The bladder 15 is adapted for fluid communication with a check valve 30 and pressure sensor 20, shown in FIG. 1, preferably by connection to the manifold 220.

The operation of the bladder of FIGS. 2a, 2b and 2c is illustrated in FIGS. 3a, 3b and 3c and FIGS.4a, 4b and 4c Upon assembly, the fluid in the bladder 15 is first evacuated, for example with a vacuum source or by compression. After removing the source of evacuation, the foam inserts 230 in alternate cells 210 expand, drawing air into those expanding cells 210, while the other cells 210 without foam inserts 230 remain evacuated. This places the bladder 15 in an initial partially filled state, as illustrated in FIGS. 3a, 3b and 3c Thereafter, the bladder may be subjected to a range of environmental conditions. Conditions of high ambient temperature or low ambient pressure cause the gas in the bladder 15 to expand from those cells 210 containing the foam inserts 230 into the adjacent cells 210 not foam inserts 230, whereby the potential expansion volume of the initially evacuated cells 210 is sufficient to prevent the pressure of the unloaded bladder 15 from exceeding ambient pressure, thereby preserving the accuracy of the associated hydrostatic weight sensor 10.

The foam inserts 230 illustrated in FIGS. 2a, 2b and 2c; FIGS. 3a, 3b and 3c; and FIGS. 4a, 4b 4c are one possible embodiment of a cell-filling restoring medium or mechanism which acts to regulate the volume of the associated cells 210 of the bladder 15. Alternately, other types of spring elements may replace or cooperate with the foam inserts 230, such as helical springs, elastic tubes, or elastic corrugated material.

FIGS. 5a, 5b and 5c and FIGS. 6a, 6b and 6c illustrate the operation of an alternate cell-filling restoring medium or mechanism whereby the bladder 15 is constructed as in FIGS. 2a, 2b and 2c except that instead of the incorporation of foam inserts 230 therefor, the top surfaces 510 of alternate cells 210 are secured to the bottom of the seat cushion 44 by adhesion, whereby the restorative action of the seat cushion acts to lift the adhesively secured top surfaces 510 with the seat cushion 44, thereby restoring the volume of fluid contained in the associated cells. As with FIGS. 3a, 3b and 3c and FIGS. 4a, 4b and 4c respectively for the first embodiment, FIGS. 5a, 5b and 5c illustrate this embodiment of the bladder in an initially filled state, while FIG. 6a, 6b and 6c illustrate the same bladder under environmental conditions which cause the initial volume of gas to expand.

One disadvantage of the embodiment of FIGS. 2a, 2b and 2c not present in the embodiment of FIGS. 5a, 5b and 5c and FIGS. 6a, 6b and 6c is that the foam insert 230 provides an alternate path for loads through the bladder 15, whereby that portion of the load supported thereby would not be detected by the associated pressure sensor 20.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A system for sensing the weight of an occupant on a vehicle seat, comprising:
   a. a bladder mounted beneath the cushion of the seat and supported by the base of the seat, whereby said bladder is constructed from a flexible material and comprises a plurality of cells in fluid communication with one another;
   b. a sensing fluid contained by said bladder;
   c. a source of sensing fluid external to said bladder;
   d. a cell-filling restoring mechanism operative on a portion of said cells of said bladder;
   e. a pressure sensor operatively coupled to said bladder for generating a signal responsive to the pressure of said sensing fluid within said bladder;
   f. a check valve having an inlet and an outlet, whereby said inlet is operatively coupled to said source of sensing fluid and said outlet is in fluid communication with said plurality of cells of said bladder, and said check valve can admit said sensing fluid from said source of sensing fluid into said bladder responsive to said cell-filling restoring mechanism; and
   g. a signal processor for calculating the weight of the occupant from said signal.

2. A system for sensing the weight of an occupant on a vehicle seat as recited in claim 1, further comprising a manifold in fluid communication with said plurality of cells of said bladder, whereby said check valve is in fluid communication with said plurality of cells of said bladder through said manifold.

3. A system for sensing the weight of an occupant on a vehicle seat as recited in claim 1, whereby said plurality of cells of said bladder are arranged so that each of the cells in said plurality of cells of said bladder are proximate one or more other cells in said plurality of cells of said bladder.

4. A system for sensing the weight of an occupant on a vehicle seat as recited in claim 3, whereby said cell-filling restoring mechanism comprises a compressible elastic material incorporated within said portion of said cells of said bladder.

5. A system for sensing the weight of an occupant on a vehicle seat as recited in claim 4, whereby said cell-filling restoring mechanism is operative on alternate cells of said plurality of cells of said bladder.

6. A system for sensing the weight of an occupant on a vehicle seat as recited in claim 1, whereby said cell-filling restoring mechanism is external to said bladder.

7. A system for sensing the weight of an occupant on a vehicle seat as recited in claim 6, further comprising a manifold in fluid communication with said plurality of cells of said bladder, whereby said check valve is in fluid communication with said plurality of cells of said bladder through said manifold.

8. A system for sensing the weight of an occupant on a vehicle seat as recited in claim 6, whereby said plurality of cells of said bladder are arranged so that each of the cells in said plurality of cells of said bladder are proximate one or more other cells in said plurality of cells of said bladder.

9. A system for sensing the weight of an occupant on a vehicle seat as recited in claim 8, whereby said cell-filling restoring mechanism is operative on alternate cells of said plurality of cells of said bladder.

10. A system for sensing the weight of an occupant on a vehicle seat as recited in claim 6, whereby said cell-filling restoring mechanism is realized by coupling said portion of said cells of said bladder to the underside of the seat cushion.

11. A system for sensing the weight of an occupant on a vehicle seat as recited in claim 1, whereby said pressure sensor is responsive to the difference in pressure between the pressure of said sensing fluid and the local atmospheric pressure.

12. A system for sensing the weight of an occupant on a vehicle seat as recited in claim 1, further comprising a load distributor adjacent at least one of the load bearing surfaces of said bladder.

13. A method of sensing the weight of an occupant an-occupant on a vehicle seat, comprising:
   a. interposing a bladder in series with the load path which supports the occupant in the vehicle seat, whereby said bladder comprises a plurality of cells in fluid communication with one another, said bladder incorporates a sensing fluid and a pressure sensor in fluid communication therewith, said pressure sensor generates a signal responsive to the pressure of said sensing fluid, and said pressure is responsive to the component of occupant weight applied by the occupant on the vehicle seat to said bladder;

b. restoring the volume of a portion of said plurality of cells of said bladder when the weight of the occupant is removed from said bladder;

c. admitting sensing fluid into said bladder from a source of sensing fluid when the pressure of said sensing fluid in said bladder is less than the pressure of said sensing fluid within said source of sensing fluid; and d. generating a measure responsive to the weight of the occupant from said signal.

14. A method of sensing an occupant on a vehicle seat as recited in claim 13, further comprising the operation of filtering said sensing fluid from said source of sensing fluid.

15. A method of sensing an occupant on a vehicle seat as recited in claim 14, further comprising the operation of distributing the applied load across at least one of the load bearing surfaces of said bladder.

* * * * *

UNITED STATES PATENT AND TRADEMARK OFFICE
CERTIFICATE OF CORRECTION

PATENT NO.    : 5,927,427
DATED         : July 27, 1999
INVENTOR(S)   : Sewell et al.

Page 1 of 1

It is certified that error appears in the above-identified patent and that said Letters Patent is hereby corrected as shown below:

Title page,
Item [54], Title, should read -- SEAT WEIGHT SENSOR HAVING SELF-REGULATING FLUID FILLED BLADDER --

Signed and Sealed this

Twenty-seventh Day of April, 2004

JON W. DUDAS
*Acting Director of the United States Patent and Trademark Office*